(Model.)
J. E. WELLS.
RAILWAY TIME AND SPEED PRE-INDICATOR.
No. 258,268. Patented May 23, 1882.
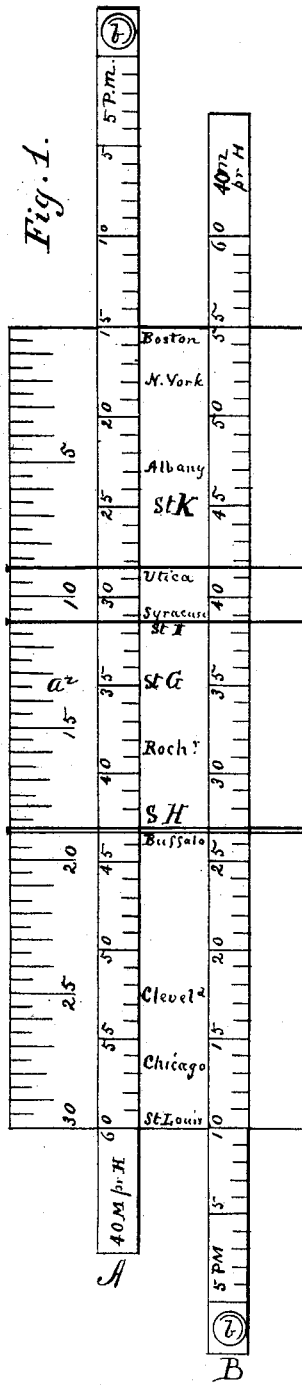
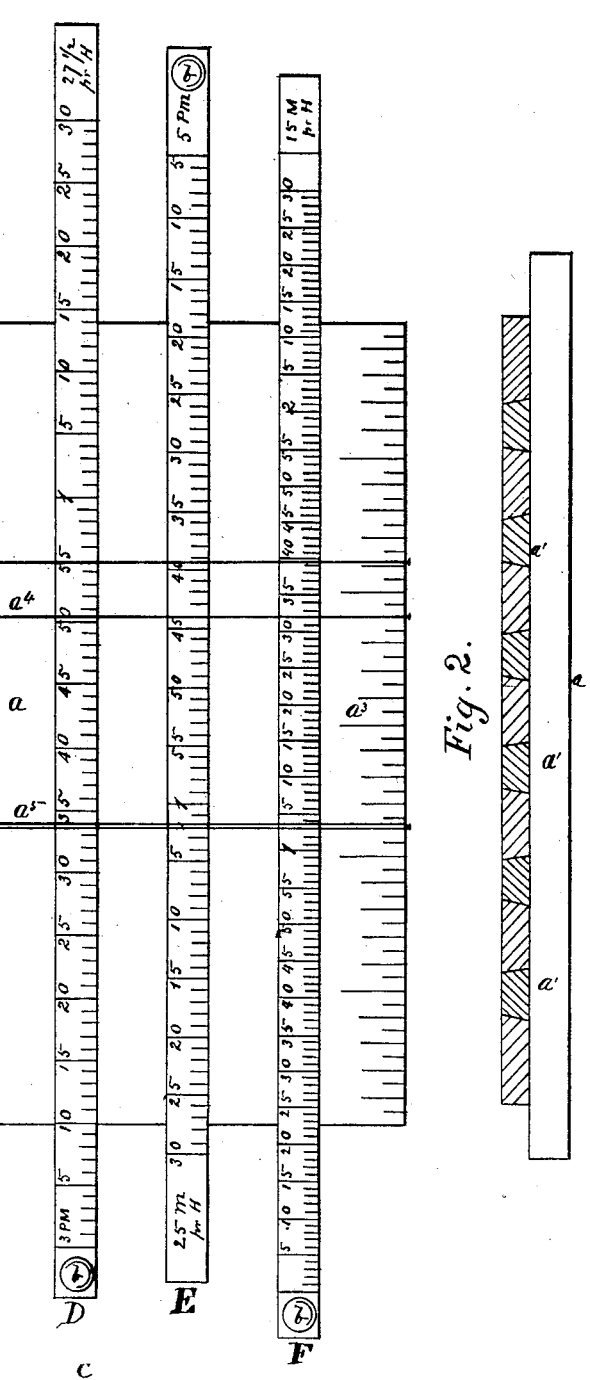
Witnesses:
A. Parker.
B. Coventry.
Inventor:
James E. Wells
By R. S. & A. P. Lacey
Attorneys.

UNITED STATES PATENT OFFICE.

JAMES E. WELLS, OF AUBURN, NEW YORK.

RAILWAY TIME AND SPEED PRE-INDICATOR.

SPECIFICATION forming part of Letters Patent No. 258,268, dated May 23, 1882.

Application filed July 11, 1881. (Model.)

*To all whom it may concern:*

Be it known that I, JAMES E. WELLS, a citizen of the United States, residing at Auburn, in the county of Cayuga and State of New York, have invented certain new and useful Improvements in Railway Time and Speed Pre-Indicators; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a device to be used by a railroad train-dispatcher, or other railway officials who have the management of trains in hand, for the purpose of determining the time that trains are due at all stations; also indicating the time and place for the meeting and passing of all trains, so that time-tables for the benefit of the traveling public may be arranged therefrom.

It consists in a base-plate of any desired material and length, having formed in it a series of channels or grooves and a series of sliding bars placed in the channels or grooves, and a peculiar method of graduating the base-plate and slides, all of which will be hereinafter fully explained.

In the drawings, Figure 1 is a plan, and Fig. 2 is a cross-section, of a device constructed according to my invention; and Fig. 3 shows one of the signal-posts.

$a$ is the base-plate, representing thirty miles. In this plate are formed a series of parallel grooves or channels, $a'$, in which move graduated slides, each of which represents one railway-train.

On the outer edges of the base-plate are marked degrees $a^2$ $a^3$, graduated to indicate thirty miles and less, or the length of any given railway. Across from side to side $a^4$ $a^5$, I mark a series of lines or stretch a series of cords, or both, to mark the place of stations, so that the eye can more readily see the time on the slides that trains are due at any given station. At $a^5$, I employ two cords, or mark two lines of different colors, to indicate a railway-crossing.

Within the grooves $a'$, I place the series of slides A, B, C, D, E, and F, each provided on its end with a thumb-piece or handle, $b$. Each slide is graduated, as shown, and represents a train in motion at the rate of speed indicated on the end opposite to the thumb-piece.

The base-plate may be constructed to hold more or less slides than the number shown. On that end of each slide next to the thumb-piece the hour for the starting of the train is marked, or the train may be started at any time desired in that hour, and on the opposite end is marked the rate of speed the train will travel. The small figures and degrees marked on the top of the slides indicate minutes. The degrees and numerals on the three slides having thumb-pieces at the right of Fig. 1 represent three trains which move in one direction at different points on the route at the same time, and at the rate of speed indicated on the slide. The figures on the other three slides, graduated from the left-hand side to the right, represent three trains moving in an opposite direction at different points on the route at the same time, meeting the three coming toward them at different points on the route at the hour and minute indicated on the slide. For illustration take the slides A B. They mark first 5 p. m. as the starting or initial hour. On their opposite ends the speed of forty miles per hour is indicated. The figures on A run in an opposite direction to the figures on B.

The slide A represents a train starting from the commencement of the route at 5 p. m. The slide B represents a train starting from the opposite or terminal end of the route at the same time.

If the time for starting be fixed at five o'clock and fifteen minutes p. m. for the train represented by the slide A, the latter will be moved so as to bring the number 15 flush with the edge of the board $a$, as shown in Fig. 1. Again, if the time for starting the train represented by slide B from the opposite end of the route be fixed at five o'clock and ten minutes p. m., the said slide B will be adjusted in its groove so as to bring the number 10 flush with the edge of the board, as shown. This adjustment of the slides shows at a glance the time determined upon for the starting of the two trains. If the two trains started at the same minute, they would meet at a point midway between the ends of the road.

In the illustration given above train B starts five minutes before train A, and will have run a distance of three and one-third miles (the rate being forty miles per hour) before train A starts. This will carry train B three and one-third miles past the middle of the road (marked 15 in margin) before it meets train A, which meeting-point is marked by 35, or St. G, on the slides. This meeting-point can be marked by any suitable means, as, for example, crosslines of different colors.

The exact meeting-time for slides A and B is seen to be five o'clock and thirty-five minutes, and they will meet at station G. (Marked St. G in the drawings.)

Whenever and wherever meeting and passing trains are indicated signal-posts of different colors will be placed on the movable slides at the minute-degree where the trains meet or pass.

In the above illustration trains A and B meet at 5:35 p. m., and at this point (5:35 p. m.) two signal-posts of the same color will be used, one on slide A, the other on slide B. When one train overtakes and passes another signal-posts of different color will be used in same manner as for meeting trains.

In the said illustration train B, running at the rate of speed indicated—viz., forty miles per hour—will reach station H, which is also a railway-crossing, at twenty-seven minutes after five o'clock, station I at 5:38½ p. m., station K at 5:45 p. m., and the end of the route at 5:55 p. m.

When the railway is longer than that indicated in the example given the base-plate will be made longer, or the degrees will be graduated finer, as may be preferred.

The slides are longer than the base-plate, so that the rate of speed can be marked on one end and sixty minute-degrees and thumb-piece placed on the opposite end, projecting out of the base-plate.

The faster the train travels per hour the coarser will be the graduated degrees, and the more slowly the train moves the finer will be the graduated degrees, as shown by the slide F. At the end of each hour's run a large boldface figure is placed to indicate that one hour is to be added to the time preceding. (See the figures 1 and 2 on slide F.) There will be as many slides on any given railway as there are trains running at different rates of speed.

The slide marked 15 M. per hour (or any other) may serve for as many trains that move in one direction at said rate of speed. By this pre-indicator a train of any given rate of speed can be arranged to start from any desired station at any minute in the hour by moving the slide until the minute-degree on its top comes flush with the station line or mark stretched across from side to side. Thus a time-table can be arranged from the pre-indicator without difficulty and in a rapid manner.

By this device I furnish a perpetual pre-indicator to arrange and make up time-tables from by indicating the time and place for the meeting and passing and departing from stations of all trains running over any given road in one and contrary directions and at different rates of speed.

By this device a railway official can determine how fast a train must travel per hour to make a desired connection or reach a distant station.

By this device an extra train can be arranged in a few minutes to meet and pass moving trains and stations without difficulty.

The marks near the thumb-piece, indicating the hour of starting, may be made on paper or small tablets and fastened by any suitable means, so that they can be readily removed and changed as required.

Having thus described my invention, what I claim, and desire to secure by Letters Patent, is—

A time, speed, and distance indicator for railways, composed of a base-plate provided with a series of longitudinal channels, and having its edges graduated to indicate miles, and a series of movable slides placed in the channels in the base-plate, and having their upper faces graduated to indicate the time and speed of the train, substantially as set forth.

In testimony whereof I affix my signature in presence of two witnesses.

JAMES E. WELLS.

Witnesses:
WILLIAM MICKLEY,
CHARLES M. MILES.